United States Patent [19]
Bittner et al.

[11] 4,320,104
[45] Mar. 16, 1982

[54] PROCESS FOR THE PRODUCTION OF HYDROGEN CYANIDE

[75] Inventors: Friedrich Bittner, Bad Soden; Carl Voigt, Rodenbach; Peter Kleinschmit, Hanau, all of Fed. Rep. of Germany

[73] Assignee: Degussa Aktiengesellschaft, Frankfurt, Fed. Rep. of Germany

[21] Appl. No.: 183,955

[22] Filed: Sep. 3, 1980

[30] Foreign Application Priority Data

Sep. 5, 1979 [DE] Fed. Rep. of Germany ....... 2935784

[51] Int. Cl.³ ............................................. C01C 3/02
[52] U.S. Cl. ................................... 423/375; 422/197; 422/240
[58] Field of Search ................................ 423/375, 376

[56] References Cited

U.S. PATENT DOCUMENTS

| | | | |
|---|---|---|---|
| 2,935,840 | 5/1960 | Schoppe | 261/79 A |
| 2,987,382 | 6/1961 | Endter et al. | 422/204 |
| 3,063,803 | 11/1962 | Fujise et al. | 423/375 |
| 3,437,436 | 4/1969 | Ummelen et al. | 423/375 |

*Primary Examiner*—O. R. Vertiz
*Assistant Examiner*—Wayne A. Langel
*Attorney, Agent, or Firm*—Cushman, Darby & Cushman

[57] ABSTRACT

By introducing the reaction gas mixture of hydrocarbons and ammonia at increased velocity through an inlet tube with one or more openings in a customary reaction tube in the hydrocyanic acid-methane-ammonia (BMA) process the yield of HCN is increased considerably.

14 Claims, 4 Drawing Figures

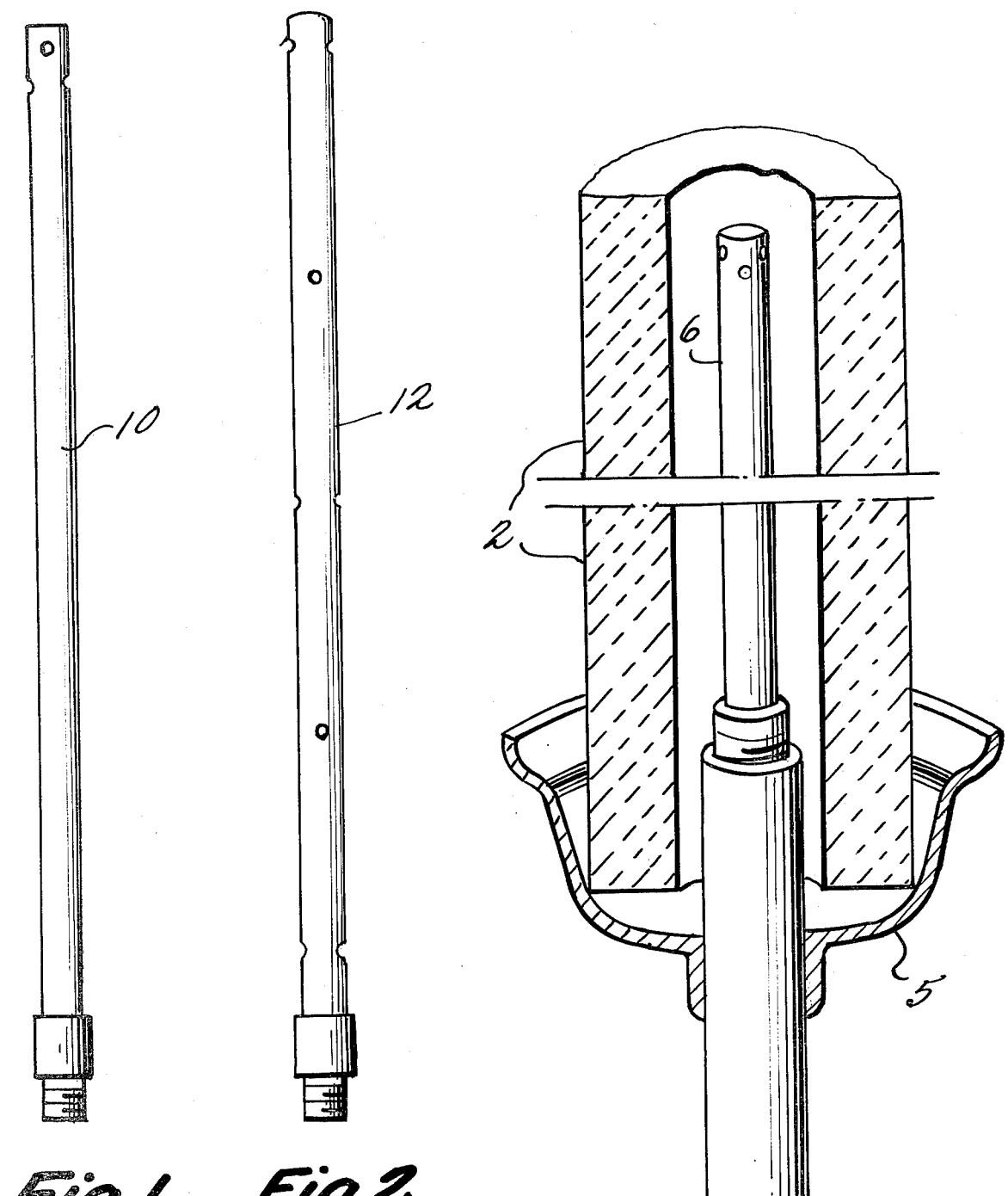

PROCESS FOR THE PRODUCTION OF HYDROGEN CYANIDE

BACKGROUND OF THE INVENTION

The so-called BMA process (hydrocyanic acid-methane-ammonia process) for the production of hydrogen cyanide or hydrocyanic acid as is known starts from methane and ammonia and operates in the absence of oxygen or air.

The reaction itself is carried out in suspending reaction tubes made of sintered aluminum oxide, which are lined internally with a platinum catalyst.

The connection between these ceramic reaction tubes and the gas distribution suitably takes place via a copper tulip, see, e.g. FIG. 4 and Endter German Pat. No. 959,364 and related Endter et al U.S. Pat. No. 2,987,382. The entire disclosures of the Endter et al U.S. patent and the Endter German patent are hereby incorporated by reference and relied upon.

Since the reaction proceeds endothermically the reaction tubes are heated and thereby reaction temperatures maintained at around 1300° C. In order to avoid the occurrence of the reverse reaction the hydrogen cyanide containing gaseous mixture formed must be cooled quickly to temperatures below 400° to 300° C. which takes place in a water cooled chamber made of aluminum in the furnace top itself, see Ullmann, Enzyklopadie der technischen Chemie, 4th edition, Vol. 9 pages 657–659, particularly 659; Dechema-Monograph, 1959, number 33 pages 28–46 and also German Pat. No. 959,364 and Endter et al U.S. Pat. No. 2,987,382.

According to German application P No. 29 13925.1-41 and related Voigt U.S. application Ser. No. 133,358 filed Mar. 24, 1980 it has also been proposed already to employ liquified aliphatic hydrocarbon gases in place of methane. The entire disclosure of the Voigt U.S. application is hereby incorporated by reference and relied upon.

In employing methane the yield of hydrogen cyanide is about 85 volume % of theory based on the ammonia employed and about 90 volume % of theory based on the methane employed, see Ullman loc. cit.

Before the recovery of free hydrogen cyanide from the product gas stream the unreacted ammonia must be removed in some form from the product gas stream, e.g. with dilute sulfuric acid as ammonium sulfate. This requires an additional expense and besides additional costs.

The object of the process of the invention therefore is to increase the yield of hydrogen cyanide in the hydrocyanic acid-methane-ammonia process and also to reduce the portion of ammonia in the product gas.

SUMMARY OF THE INVENTION

It has now been found that the yield of hydrogen cyanide in the so-called hydrocyanic acid-methane-ammonia process can be substantially increased if the gaseous mixture of ammonia and aliphatic short chain hydrocarbons, e.g. alkanes, preferably methane are blown with increased velocity into the reaction tube entirely or partially through a feed pipe with one or more openings which is located inside the reaction tube and the product gas obtained is worked up in the customary manner.

As hydrocarbons besides methane there can be used for example aliphatic hydrocarbons having 3 and 4 carbon atoms which are liquified gases propane, n-butane and isobutane whereby with the use of the liquified gases additional hydrogen must be present, namely in an atomic ratio of C:N:H of 1:1:7.1 to 1:1.33:13, see German application P No. 29 13925.1-41 and Voigt U.S. application Ser. No. 133,358 filed Mar. 24, 1980.

At the present time there is employed industrially mainly methane that is used both in pure form as well as in commercial form, e.g. as natural gas or refinery gas. In using natural gas and refinery gas there are preferred gases with a total content of methane of 60 to nearly 100 volume % which only contain small amounts of higher hydrocarbons, particularly aromatics, and whose by-product constituents are chiefly nitrogen and/or hydrogen.

The reaction gas mixture of the hydrocarbon and ammonia is produced in known manner.

These gas mixtures which should be reacted in the customary reaction tubes coated with platinum, are preferably supplied into the reaction tube preferably with an elevated supply pressure of at least 1.2 bar absolute namely via the supply pipe which lets the gas with higher speed go out. The supply pressure can be as high as 10 bar (abs.).

These supply pipes are located in the inside of the reaction tube and are so constructed that the reaction gas passes out into the reaction tube entirely or partially from suitable openings in the walls of the supply pipes, e.g. through nozzles with high velocity tangential to and/or perpendicular to the main flow direction (direction from the beginning of the tube toward the tube ends).

The supply pipes can project into the reaction tube as far as desired, preferably their ends are located in positions of FIG. 3.

These are considered for the supply pipes only such construction which hold the stresses as low as possible, to which the ceramic tube that is heated externally to more than 1300° C. is exposed through inpactment of the cold reaction mixture generally having a temperature less than 300° C.

The gas outlet openings can be arranged at any desired height in the supply pipes. They can be distributed either only on a tube segment or over the entire length of the tube.

BRIEF DESCRIPTION OF THE DRAWINGS

FIG. 1 illustrates one form of supply pipe;

FIG. 2 illustrates another form of supply pipe;

FIG. 4 is a sectional view of a supply pipe according to the invention.

Figure 3:
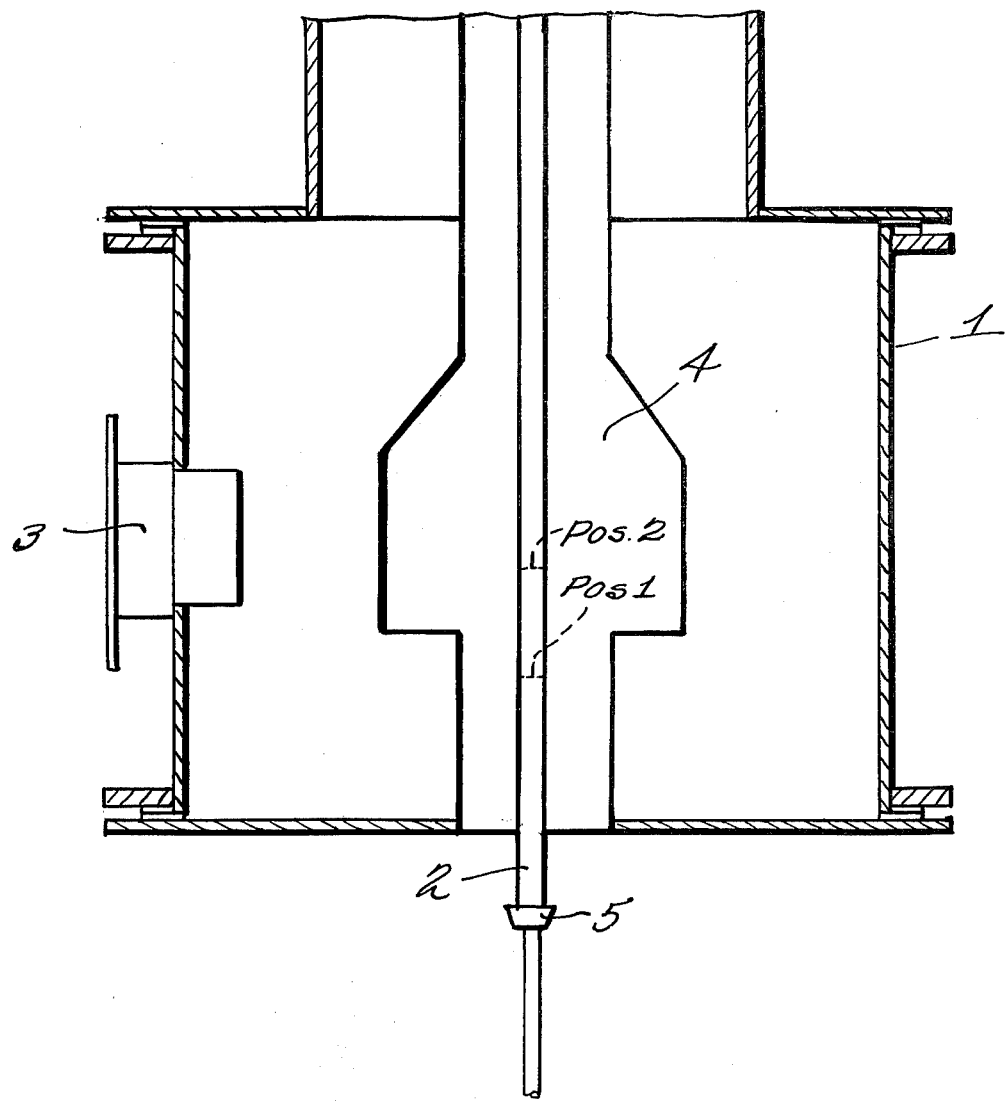
FIG. 3 is a sectional view of the BMA apparatus.

Of the numerous possible constructions of the supply pipes there have particularly proven good the supply pipe 10 of FIG. 1 and the supply pipe 12 of FIG. 2. With them there is assured that the gas outlet openings project sufficiently far into the furnace space and simultaneously that the thermal load of the ceramic reaction tube is reduced, since the gases in the supply portion are brought to higher temperatures.

The bores are so placed that the gas goes out perpendicular or tangentially to the openings.

Instead of bores there can also be used narrow slits, screens or slots.

Preferably the upper diameter of the supply pipe is completely closed and has no openings.

In experiments the number of outlet openings and their size was so chosen that the gas according to the supply pressure came out with higher velocity (greater than 200 m/sec). The velocity can be as high as about 1200 m/sec.

As materials for the tube there are used first materials which are as free of iron as possible, as commercial copper or ceramic, but there can also be employed acid and corrosion resistance steels, e.g. V-steels. Copper is preferred.

The cylindrically shaped pipes which are preferably closed at the upper end are so inserted in the customary ceramic reaction tube for the distribution of gas that they are soldered or screwed on at the lower open end with a metallic tube with the tulip set up in the ceramic reaction tube. With only partial introduction of the gas through the openings of the supply pipes the residual gas must be supplied separate therefrom in known manner through the metallic tube of the tulip into the ceramic tube.

An advantage of the process of the invention is that it is relatively simple to install the supply pipes on the copper tulips at the tube entrance, see FIG. 4, and therewith no great changes must be undertaken, particularly in the furnace.

By a tulip, as is shown in FIG. 4, is meant a connecting tube between the ceramic tube and the (not shown) customary gas distributor, which contains the ceramic tube at its lower end. Usually this connecting tube has the configuration of a tulip and is known per se from German Pat. No. 959,364 FIG. 1 and Endter U.S. Pat. No. 2,987,382 FIG. 2.

According to the process of the invention it is now possible without further ado to obtain yields up to 97% of theory based on the hydrocarbon employed, preferably methane, employing the previously customary starting materials and gas compositions and the, of themselves, customary reaction tubes, and particularly while maintaining the previously customary throughputs of more than 20 moles of hydrocarbon per tube per hour. This is attained through a simple additional equipping of the reaction tube with a supply pipe for the reacting gas mixture.

This type of increase of the yields which for decades had remained unchanged was completely unexpected.

The process can comprise, consist essentially of or consist of the steps set forth with the stated materials. The apparatus can comprise, consist essentially of or consist of the stated parts.

The invention will be further explained in the following examples.

DETAILED DESCRIPTION

The experiments were carried out in a customary BMA apparatus which consisted of an apparatus for metering gas and gas mixtures (not shown) as well as a gas heated reaction furnace 1, burner 3, burner space 4 as well as ceramic tube 2 which discharges into a tulip 5, which additionally possesses in the lower part of the ceramic tube 2 supply pipes whose upper ends extend to position 1 or position 2, through which the reaction gas is blown tangentially and/or perpendicularly into the ceramic tube, see FIG. 3.

The ceramic tube 2 and the supply pipes, e.g. a nozzle are represented individually again in FIG. 4.

The ceramic tube 2 connected with the tulip 5 which produces the connection for gas distribution in its lower portion contains the nozzle 6 which is screwed directly with the inner tube of the tulip 5.

EXAMPLE 1

(Comparison Example)

There was introduced into the described BMA apparatus a gas of the following molar composition methane to ammonia = 1:1.1, and quickly heated to 1300° C. at about 1 bar absolute.

After running through the reaction tubes the product gas mixtures formed was cooled in known manner in the top of the furnace to a temperature below 400° C. and greater than 30° C. The yield was 82.7 mole % of hydrogen cyanide based on the ammonia employed and 91 mole % based on the methane employed. The residual gas after the absorption of unreacted ammonia in sulfuric acid as well as hydrogen cyanide in, e.g. aqueous sodium hydroxide, known in itself, had a gas chromatographically ascertained composition of 96 volume % hydrogen, 1 volume % nitrogen and 3 volume % methane.

EXAMPLE 2

There was also employed in an apparatus the same as that in Example 1 the same gaseous mixture with the only difference that this gaseous mixture was supplied in the lower portion of the reaction tube 2 via nozzle 6, see FIG. 4.

The nozzle used corresponds to FIG. 1. The bores whose dimensions were ascertained in preliminary experiments, allowed the gas mixture to come out with a velocity of about 400 m/sec. The upper end of the nozzle 6 was located in position 1 of FIG. 3.

Before the nozzle the pressure of the gaseous mixture was 2 bar absolute which was reduced directly behind the nozzle opening to 1 bar absolute in the reaction tube.

The yield was 93.3 mole % based on the methane employed and 84.8 mole % based on the ammonia employed. The composition of the residual gas after the absorption analogous to Example 1 was carried out amounted to 97.0 volume % hydrogen, 2.3 volume % methane and 0.7 volume % nitrogen.

EXAMPLE 3

Analogous to Example 2 there was built into the interior of the BMA reaction tube a nozzle 6, which, however had bores over the entire length (FIG. 2) and whose upper end is located at position 2 in FIG. 3. At the same ratios and same molar composition of the starting gas "methane to ammonia" of 1:1.1 the yield amounted to 97.2 mole % based on the methane employed and 88.4 mole % based on the ammonia employed.

The composition of the residual gas after the absorption analogous to Example 1 was carried out amounted to 98.5 volume % hydrogen, 0.5 volume % nitrogen and 1.0 volume % methane.

The entire disclosure of German priority application No. P 29 35784.4-41 is hereby incorporated by reference.

What is claimed is:

1. In a process for the production of hydrogen cyanide or hydrocyanic acid in a reaction tube from a hydrocarbon and ammonia by the BMA process or a process identical with the BMA process except that there is employed an aliphatic short chain hydrocarbon other than methane, the improvement comprising blowing in a gaseous mixture of ammonia and the aliphatic short chain hydrocarbon at least partially through a supply pipe with at least one opening and located in the interior of the reaction tube at a velocity above 200 meters/second, the upper diameter of said supply pipe being completely closed and having no openings, and recovering the product gas formed.

2. The process of claim 1 wherein to produce a high velocity the gaseous mixture of ammonia and hydrocarbon is supplied at an absolute pressure of at least 1.2 bar.

3. The process of claim 2 wherein the gaseous mixture is supplied at a velocity up to 400 m/sec.

4. The process of claim 3 wherein the supply pressure is 1.2 to 2 bar absolute.

5. The process of claim 3 wherein the velocity is 400 m/sec.

6. The process of claim 1 wherein the aliphatic hydrocarbon consists essentially of methane, propane, at least one butane or a mixture of propane and at least one butane.

7. The process of claim 6 wherein the aliphatic hydrocarbon is methane.

8. The process of claim 1 wherein the gaseous mixture at least partially is blown out tangentially to at least one opening of the supply pipe.

9. The process of claim 1 wherein the gaseous mixture at least partially comes out of at least one opening over the length of a central inlet tube inserted in the interior of the reaction tube and the openings of the inlet tube are perpendicular to the axis of the reaction tube.

10. A process according to claim 1 wherein said aliphatic short chain hydrocarbon other than methane is an alkane.

11. A process according to claim 1 wherein the gas supplied consists essentially of ammonia and the hydrocarbon.

12. A process according to claim 1 wherein the gas supplied consists essentially of ammonia and methane.

13. A process according to claim 1 wherein the gas supplied consists of ammonia and the hydrocarbon.

14. A process according to claim 1 wherein the gas supplied consists of ammonia and methane.

* * * * *